E. C. SMITH.
SIDE DELIVERY RAKE.
APPLICATION FILED SEPT. 20, 1916.
1,256,178.
Patented Feb. 12, 1918.
3 SHEETS—SHEET 1.
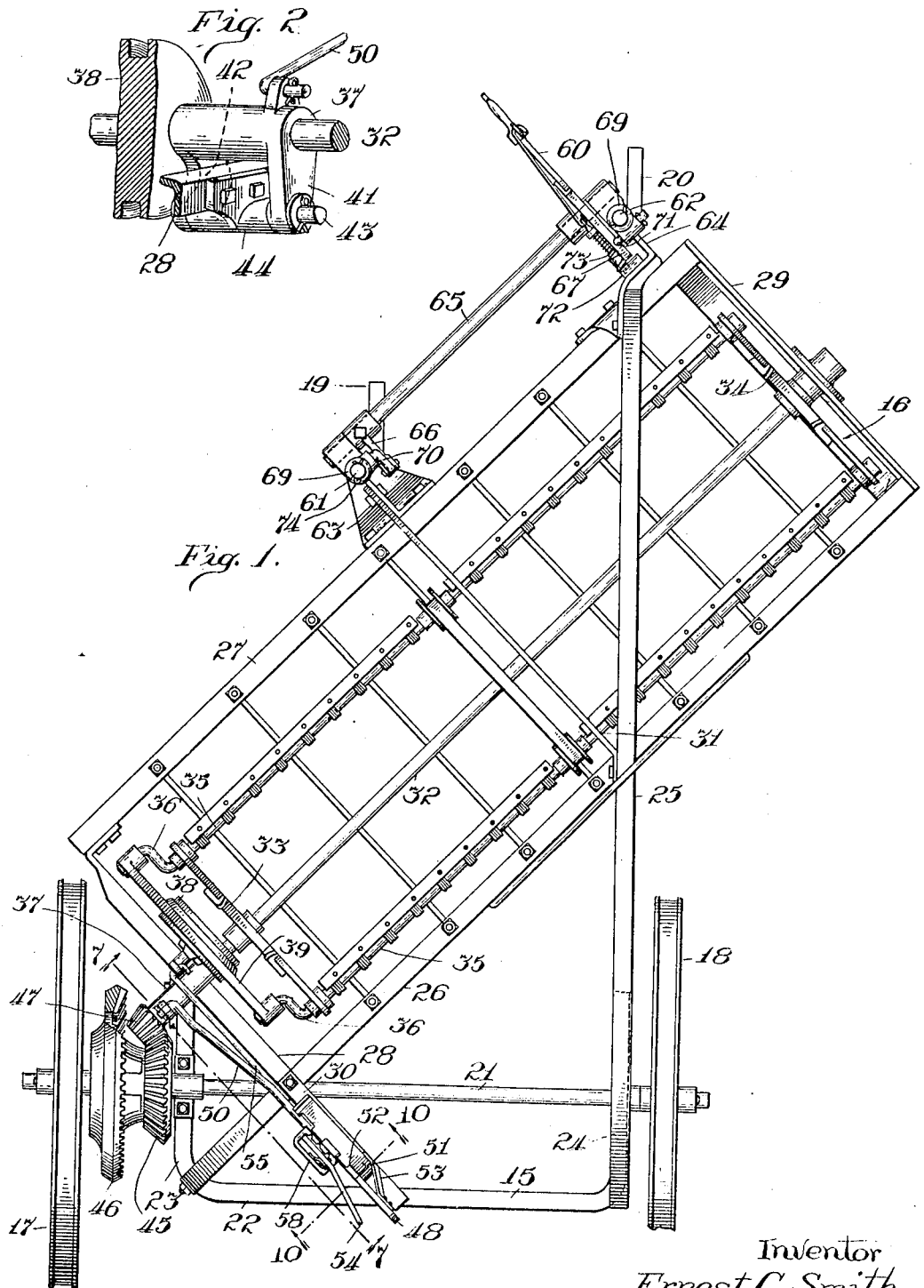
Inventor
Ernest C. Smith
By Gillson & Gillson
Attorneys

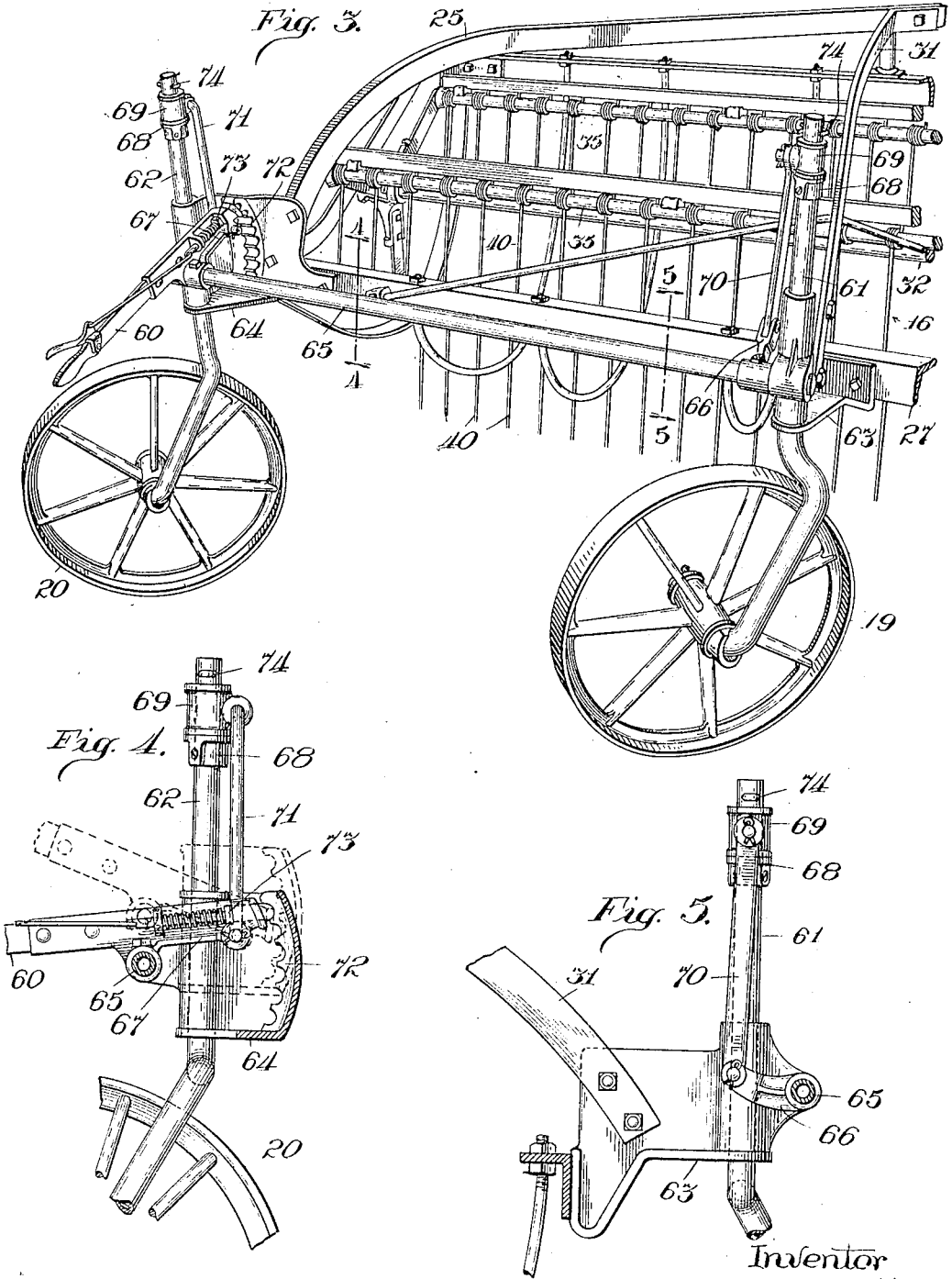

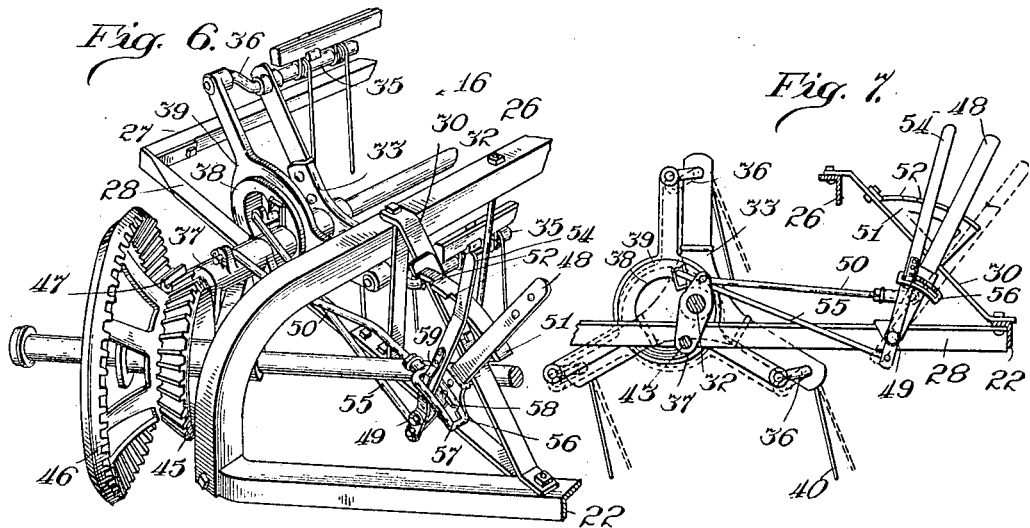
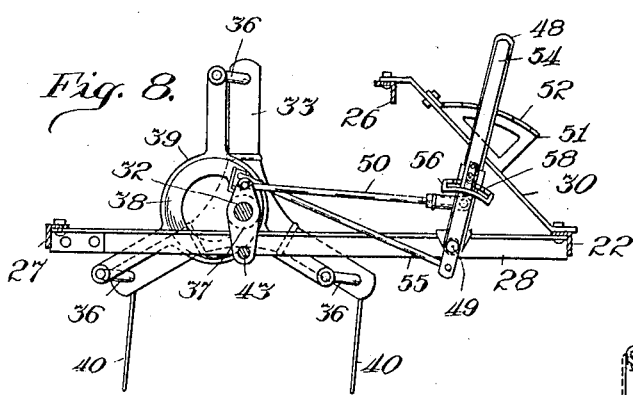
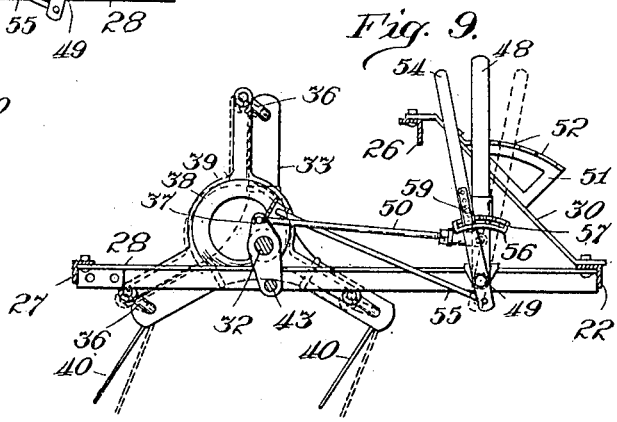
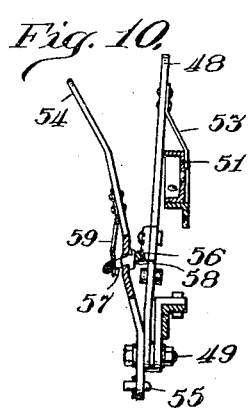

UNITED STATES PATENT OFFICE.

ERNEST C. SMITH, OF HOOSICK FALLS, NEW YORK, ASSIGNOR TO WALTER A. WOOD MOWING & REAPING MACHINE CO., OF HOOSICK FALLS, NEW YORK, A CORPORATION OF NEW YORK.

SIDE-DELIVERY RAKE.

1,256,178.

Specification of Letters Patent.

Patented Feb. 12, 1918.

Application filed September 20, 1916. Serial No. 121,168.

*To all whom it may concern:*

Be it known that I, ERNEST C. SMITH, a citizen of the United States, and resident of Hoosick Falls, county of Rensselaer, and State of New York, have invented certain new and useful Improvements in Side-Delivery Rakes, of which the following is a specification, and which are illustrated in the accompanying drawings, forming a part thereof.

The invention relates to side delivery rakes and more particularly to those which are constructed for alternative use as a tedder. The object of the invention is to provide a combined side delivery rake and tedder wherein an adequate change in the inclination of the rake teeth for the two uses of the machine automatically accompanies the reversal of the rake shaft, and provision is also made for independently varying the inclination of the rake teeth for either of said uses. An additional feature of the improved construction relates to the vertical adjustment of the rake.

In the accompanying drawings,

Figure 1 is a plan view of the improved rake with some of the parts broken away to facilitate illustration;

Fig. 2 is a detail perspective view showing certain parts as they appear when viewed from the rear, and with some of the said parts shown in section;

Fig. 3 is a detail perspective view showing the rear end portion of the improved machine;

Figs. 4 and 5 are detail sectional views, the sectional planes of the two views being indicated by the lines 4—4 and 5—5, respectively on Fig. 3;

Fig. 6 is a detail perspective view showing one side of the machine as viewed from the front with some of the parts omitted;

Fig. 7 is a detail sectional view taken on the line 7—7 of Fig. 1, with different adjusted positions of the rake teeth shown in dotted lines;

Figs. 8 and 9 are each similar to Fig. 7, but show additional positions of the parts, and Fig. 10 is a detail sectional view taken on the line 10—10 of Fig. 1.

The improved rake preferably comprises a three cornered frame, generally designated 15, an inclined raking reel, generally designated 16, the main carrying wheels, 17 and 18, located at opposite sides of the frame 15 near its front end and two caster wheels 19, 20. The carrying wheels 17, 18, are mounted upon the ends of the axle, as 21, in the usual manner, and the frame 15 includes a front cross piece 22 having backwardly turned end portions 23, 24 upon which the said axle 21 is journaled. The frame 15 further includes a main longitudinal frame member 25 and a plurality of oblique frame members, as 26, 27, 28 and 29. The longitudinal frame member 25 extends from the front to the rear end of the machine and arches over the reel 16 while two of the oblique frame members as 26 and 27, extend parallel with the reel 16 and are located in front and in rear of the same at different levels. The two remaining oblique frame members 28 and 29 are transverse to the reel 16 and are located adjacent its opposite ends, the frame member 29 being inclined to connect the frame members 26 and 27 at their rear ends while the frame member 28 is horizontal and connects the front end of the frame member 27 with an intermediate part of the front cross piece 22. There are also inclined braces 30 and 31, the brace 30 being extended between the front frame member 22, and the oblique frame member 26 and the brace 31 being extended between the longitudinal frame member 25 and a part of the inclined frame member 27 adjacent the caster wheel 19.

The reel 16 is of well known construction. It comprises the usual rake shaft 32, end frames 33 and 34 and rake bars 35, three being shown. Each rake bar 35 is provided with the usual crank arm 36 at its forward end, and the end frames 33 and 34 are fixed upon the rake shaft 32. The rake shaft is journaled at its rear end in the inclined frame member 29, and at its forward end in a swinging bracket 37 (Fig. 2). The usual stationary but angularly adjustable eccentric 38 is mounted on the rake shaft 32 between the end frame 33 and the bearing bracket 37 for guiding the rake bars 35. The eccentric strap, as 39, is formed with radial arms, equal in number to the number of rake bars 35 and each of these radial arms is connected with the crank arm 36 of one of the rake bars. The arrangement provides that the teeth, as 40, of the several rake bars 35 occupy a definite angular position during the rotation of the reel, while the inclination of these teeth is adjusted by shifting the eccentric 38.

The swinging of the bracket 37 is permitted by forming the same with depending crank arms 41 and 42 at its opposite ends. These crank arms straddle the frame member 28 and are pivotally engaged with the opposite ends of a pin 43 which extends through a stationary bracket 44, secured against the under side of the said frame member.

A pair of oppositely facing beveled gears 45 and 46, of different size, are fixed upon the axle 21 at one side of the frame 15 for driving the reel 16 in opposite directions and at different speeds. As shown, the front end of the rake shaft 32 extends between the two beveled gears 45 and 46 and is provided with a gear pinion 47 for selective engagement with the said two beveled gears. The gear 45 serves for driving the reel 16 forwardly for raking, while the gear 46 serves for driving the reel 16 rearwardly at a greater speed for tedding. Preferably the faces of the two gears 45 and 46 are separated a sufficient distance to permit of the pinion 47 occupying an intermediate position in which it is disengaged from both of the gears.

As the rake teeth are preferably inclined forwardly for raking, and rearwardly for tedding, it is desirable that the eccentric 38 should be shifted through a substantial distance simultaneously with the swinging of the bracket 37 for moving the pinion 47 from one to the other of the gears 45, 46. As shown, these adjustments are both accomplished by the swinging of a single lever, as 48. A bolt 49 serves for pivotally securing the lever 48 against the frame member 28 and a link 50 connects the lever with the swinging bracket 37. The upper end portion of the lever 48 plays over a quadrant, as 51. This quadrant is most conveniently carried by the inclined brace 30 and it is provided with notches 52 for receiving the lever 48 in three positions corresponding to the forward, intermediate and reversed positions of the pinion 47, respectively. As shown, the notches 52 are formed in one of the side faces of the quadrant 51 and a leaf spring 53 (Fig. 10) is carried by the lever 48 and rides against the opposite face of the quadrant for yieldingly engaging the lever with the several notches 52.

To permit the angular adjustment of the rake teeth 40 independently of the swinging of the bracket 37, the lever 48 is connected with the eccentric 38 through the medium of a secondary lever 54. The lever 54 may be pivotally mounted upon the same bolt, as 49, which also serves as the pivot for the lever 48, but, while the pivot bolt 49 is shown as being located adjacent the lower end of the lever 48, the secondary lever 54 extends below the said pivot bolt and a link 55 connects the lower end of the secondary lever 54 with the eccentric 38. A movement of the link 50 in one direction is accordingly accompanied by a movement of the link 55 in the opposite direction.

The lever 54 swings over a quadrant 56 and the simultaneous movement of the lever 54 with the lever 48 is accomplished by mounting the quadrant 56 upon the lever 48. As shown, the quadrant 56 takes the form of a slotted bracket with the lever 54 playing through the slot, as 57, and with the notches, as 58, of the quadrant formed in one of the side edges of the slot. A leaf spring 59 is carried by the lever 54 and rides against the other side of the slot 57 for engaging the lever with the notches 58. The quadrant 56 also conveniently serves as a means for connecting the link 50 with the lever 48.

The construction provides that the inclination of the rake teeth 40 may be adjusted whether the parts are arranged for raking, as in Figs. 1 and 7, or for tedding, as in Fig. 9. This is accomplished by swinging of the secondary lever 54 independently of the lever 48. The number of differently inclined positions to which the rake teeth may be set, either for raking or tedding is limited only by the length of the quadrant 56 and the number of notches 58 with which it is provided. On the other hand, the swinging of the lever 48 between the several positions illustrated in Figs. 7, 8 and 9, serves not only for effecting the corresponding movement of the pinion 47 between the two driving gears 45 and 46, but it also serves to shift the eccentric 38. When the lever 48 is moved from one extreme position to the other, the amount of movement imparted to the eccentric 38 is sufficient to change the angle of the rake teeth 40 from one of the forwardly inclined positions illustrated in Fig. 7 to one of the rearwardly inclined positions illustrated in Fig. 9, or vice versa.

In the construction shown, the vertical adjustment of the reel 16 is confined to that obtained by raising and lowering the frame 15 with respect to the caster wheels 19 and 20. This is preferably accomplished by the operation of a single lever as 60 (Fig. 3). As the caster wheels 19 and 20 are located at different distances from the axle 21, the vertical movement of the frame should differ with respect to the two wheels. As shown, each caster wheel is provided with the usual upright spindle, as 61 or 62. These spindles turn in brackets 63 and 64 upon the corresponding spindles 61 and 62 in different amounts.

A tubular shaft 65 extends horizontally between and is journaled at its opposite ends upon the brackets 63 and 64. This shaft carries two crank arms 66 and 67 and one of the crank arms, as 67, is socketed for the reception of the lever 60. The two crank arms 66 and 67 are of different length and are located adjacent the brackets 63 and 64, respectively, the crank arm 66 being the shorter. A collar 68 is fixed on each spindle 61, 62, above the corresponding bracket 63 or 64 and a sleeve 69 is loosely fitted to each spindle 61, 62 over the corresponding collar 68. Each sleeve 69 is connected with the adjacent crank arms 66 or 67 by a link, as 70 or 71. The weight of the frame is accordingly transmitted to the caster wheel spindle 61, 62 through the fixed collars 68, while the elevation of the frame is simultaneously adjusted with respect to both caster wheels by turning the shaft 65. One of the brackets, as 64, is formed to provide a notched quadrant 72 which is in line with the end of the adjacent crank arm, as 67, and a spring pawl 73 which plays through the end of the said crank arm coöperates with the notches of the quadrant 72 for holding the parts in adjusted position. Preferably a cotter pin 74 is set through each spindle 61, 62, over the corresponding sleeves 69 to prevent the spindle from sliding vertically out of the sleeve at any time when the corresponding caster wheel is momentarily relieved from the weight of the machine, as in traversing uneven ground.

I claim as my invention,—

1. In a combined side delivery rake and tedder, the combination with a rotating reel having an angularly adjustable rake head and a reversing gear for driving the reel in either direction, of adjusting and reversing levers operable respectively upon the rake head and the reversing gear, the adjusting lever being capable of movement independently of the reversing lever, and means for locking the levers together for movement of the adjusting lever with the reversing lever.

2. In a combined side delivery rake and tedder, the combination with an angularly adjustable rake head and reversing gear for driving the rake in either direction, of adjusting and reversing levers operable upon the said two parts respectively, the adjusting lever being capable of movement independently of the reversing lever, and means for locking the levers together in different relative positions for movement of the adjusting lever with the reversing lever.

3. In a combined side delivery rake and tedder, the combination with a rotating shaft and an angularly adjustable rake head driven thereby, of means operable by the movement of a single part to reverse the direction of rotation of the shaft and adjust the rake head, the means for adjusting the rake head being also operable separately.

4. In a combined side delivery rake and tedder, in combination, a pair of oppositely facing driving gears, a laterally movable shaft, a pinion mounted on the shaft and engaging the two gears in alternation by lateral movement of the shaft, an eccentric loosely mounted on the shaft, a reel having rakes turning with the shaft, connection between the eccentric and the rakes of the reel, a pair of levers, adjustable connection between the levers and connection between one of the levers and the shaft and between the other lever and the eccentric.

5. In a combined side delivery rake and tedder, the combination with a rotating shaft, an angularly adjustable rake head driven by the shaft, a reversing gear for driving the shaft in either direction and means for adjusting the rake head, of a pair of levers, adjustable connection between the levers, and connection between one of the levers and the reversing gear and between the other lever and the means for adjusting the rake head.

6. In a combined side delivery rake and tedder, the combination with a rotating shaft, an angularly adjustable rake head driven by the shaft, a reversing gear for driving the shaft in either direction and means for adjusting the rake head, of a lever connected with the reversing gear, a lever connected with the means for adjusting the rake head, and a notched quadrant for the second mentioned lever mounted on the other lever.

7. In a combined side delivery rake and tedder, in combination, a pair of oppositely facing driving gears, a laterally movable shaft, a pinion mounted on the shaft and engaging the two gears in alternation by lateral movement of the shaft, an eccentric loosely mounted on the shaft, and a reel having rakes turning with the shaft, connection between the eccentric and the rakes of the reel, a lever connected with the shaft, a lever connected with the eccentric, and a notched quadrant for the second mentioned lever mounted on the other lever.

8. In a side delivery rake, in combination, a three cornered frame having a relatively perpendicular front end and side, an axle extending across the frame adjacent to and parallel with its front end, a pair of oppositely facing beveled gears of different size mounted on the axle adjacent the third side of the frame, a bearing bracket movably mounted on the frames adjacent the said gears, a shaft journaled in the bearing bracket and extending between the gears and outwardly therefrom beyond the bearing bracket substantially parallel with the said third side of the frame, a pinion mounted on the shaft between the said gears, an angularly adjustable guiding member mounted on the shaft adjacent the bearing bracket, a reel having rakes turning with the shaft, connection between the angularly adjustable guiding member and the rakes of the reel, a pair of levers, adjustable connection between the levers and connection between one of the levers and the movable bearing bracket and between the other lever and the said guiding member.

9. In a side delivery rake, in combination, a three cornered frame having a relatively perpendicular front end and side, an axle extending across the frame adjacent to and parallel with its front end, a pair of oppositely facing beveled gears of different size mounted on the axle adjacent the third side of the frame, a bearing bracket movably mounted on the frames adjacent the said gears, a shaft journaled in the bearing bracket and extending between the gears and outwardly therefrom beyond the bearing bracket substantially parallel with the said third side of the frame, a pinion mounted on the shaft between the said gears, an angularly adjustable guiding member mounted on the shaft adjacent the bearing bracket, a reel having rakes turning with the shaft, connection between the angularly adjustable guiding member and the rakes of the reel, a lever connected with the movable bearing bracket, a lever connected with the said guiding member and a notched quadrant for the second mentioned lever mounted on the other lever.

10. In a side delivery rake, in combination, a three cornered frame having a relatively perpendicular front end and side, carrying wheels at opposite sides of the frame adjacent its said front end, a rake shaft extending across the frame substantially parallel with its remaining side, a pair of upright caster wheels slidingly engaged with the said remaining side of the frame at different distances from its front end, a crank shaft extending along the said remaining side of the frame between the two caster wheel spindles, cranks of different lengths upon the crank shaft adjacent its two ends and a link connecting each of the said cranks with the adjacent caster wheel spindle.

11. In combination, a frame, a transverse supporting axle for the frame adjacent one end of the frame, a pair of upright caster wheel spindles slidingly engaged with the frame at different distances from the said transverse supporting axle, a crank shaft extending horizontally between the two caster wheel spindles, a crank on the crank shaft adjacent each caster wheel spindle, the two cranks being of different lengths, and a link connecting each of the cranks with the adjacent caster wheel spindle.

ERNEST C. SMITH.

Copies of this patent may be obtained for five cents each, by addressing the "Commissioner of Patents, Washington, D. C."